United States Patent
Yajima et al.

[19]

[11] Patent Number: 5,852,480
[45] Date of Patent: Dec. 22, 1998

[54] LCD PANEL HAVING A PLURALITY OF SHUNT BUSES

[75] Inventors: Akihiro Yajima; Kohji Nakashima, both of Tokyo, Japan

[73] Assignee: NEC Corporation, Tokyo, Japan

[21] Appl. No.: 411,273

[22] Filed: Mar. 27, 1995

[30] Foreign Application Priority Data

Mar. 30, 1994 [JP] Japan .................................. 6-061736

[51] Int. Cl.⁶ .......................... G02F 1/136; G02F 1/1343
[52] U.S. Cl. ................................. 349/40; 349/39
[58] Field of Search ................. 359/54, 58, 59, 359/60, 87; 361/56, 58, 91, 111; 257/356, 59, 72, 360, 363; 345/92; 324/770; 349/39, 40, 42, 43, 54, 139, 149

[56] References Cited

U.S. PATENT DOCUMENTS

| | | | |
|---|---|---|---|
| 5,162,901 | 11/1992 | Shimada et al. | 349/39 |
| 5,235,272 | 8/1993 | Henley | 324/770 |
| 5,373,377 | 12/1994 | Ogawa et al. | 349/40 |
| 5,377,030 | 12/1994 | Suzuki et al. | 349/39 |
| 5,504,348 | 4/1996 | Yoshida et al. | 359/54 |
| 5,504,601 | 4/1996 | Watanabe et al. | 359/59 |

FOREIGN PATENT DOCUMENTS 63-106788  5/1988  Japan .

Primary Examiner—William L. Sikes
Assistant Examiner—Tai V. Duong
Attorney, Agent, or Firm—Young & Thompson

[57] ABSTRACT

An active matrix type LCD panel includes an active matrix portion including a plurality of this film transistors, a plurality of scan signal lines and a plurality of data lines, and a shunt bus formation portion including at least first and second bus lines formed independently of each other. The first shunt bus line is connected to the scan signal lines 1 and the second shunt bus line is connected to the data lines to thereby protect the transistors against a surge voltage such as electrostatic charges and facilitate a test for short-circuit conditions between the adjacent lines.

12 Claims, 3 Drawing Sheets

5,852,480

LCD PANEL HAVING A PLURALITY OF SHUNT BUSES

BACKGROUND OF THE INVENTION

The present invention relates to a liquid crystal display (LCD) panel and, more particularly, to an improvement in an active matrix type LCD panel.

An active matrix type LCD panel includes a number of thin film transistors (TFT's) arranged in rows and columns, a plurality of scan signal lines and a plurality of data lines. The gates of the TFT's arranged in the same line are connected in common to an associated one of the scan signal lines and the drains (sources) of the TFT's arranged in the same column are connected in common to an associated one of the data lines. A source (drain) of each of the TFTs is connected to a transparent electrode made of, for example, an indium tin oxide (ITO) film provided as a pixel electrode.

Each TFT is the same in basic device structure as an MOS transistor and fabricated by depositing and then selectively etching respective conductive and semiconductor layers. In the respective steps or after the fabrication, therefore, the TFT may be destroyed due to an electro-static charge applied thereto. It is therefore requested to protect each TFT against the electrostatic charge. For this purpose, a shunt bus structure is employed as disclosed by, for example, Japanese Patent Laid-open Publication Sho 63-106788.

Referring to FIG. 3, there is shown an LCD panel disclosed in the above publication. This panel includes a number of pixels 4 arranged in a matrix and each having a TFT, a pixel electrode and a storage capacitor. There are further provided scan signal lines 1, the data lines 3 and a storage line 2. In order to protect the TFT, a shunt bus line 5 is further provided and connected in common to all of the signal lines 1 and the data lines 3. This bus 5 is grounded. The storage wiring 2 is connected a pad 6. It is to be noted that the portion encircled by dotted line segments A, B, C and D is cut away later as a final LCD panel.

In the panel thus constructed, since all the TFTs are electrically short-circuited to one another by the ground shunt bus 5, each TFT can be protected against a surge voltage such as an electrostatic charge.

Recently, the LCD has been also required to enhance its resolution. In accordance therewith, the respective signal lines 1 to 3 are formed with reduced width in a fine pitch. As a result, the adjacent ones of the lines 1–3 tend to be short-circuited or some signal lines may be subjected to the breaking down. Further, two signal lines which must cross to each other in isolation may be short-circuited.

Therefore, it is convenient to check the short-circuited and/or breaking down states among the signal lines every level in the signal lines 1–3. If it is possible to do so, repairing and/or reforming signal lines can be done to thereby reduce a total cost of the LCD panel.

In the LCD panel shown in FIG. 3, however, the shunt bus 5 is formed continuously with all the signal lines 1 and 3. For this reason, it is impossible to detect undesired short-circuited states among the lines in each level.

SUMMARY OF THE INVENTION

It is therefore an object of the present invention to provide an improved LCD panel.

It is another object of the present invention to provide an LCD panel having an improved shunt bus structure in which a short-circuit test in each level of wiring are made possible while preventing a damage of TFT due to electrostatic charge.

An LCD panel according to the present invention comprises an active matrix portion having a plurality of scan signal lines, a plurality of data lines and a plurality of TFT's each connected to one of the scan signal lines and one of the data lines, and a shunt bus forming portion provided around the active matrix portion and having first and second shunt buses formed independently of each other, the first shunt bus being connected to the scan signal lines and the second shunt bus being connected to the data lines.

Thus, the first and second shunt buses are provided independently of each other, and hence it is possible to test undesired short-circuited state among the scan signal lines and those among the data lines individually. Further, with this shunt bus construction, any damage of TFT's due to electrostatic charge can be prevented. In order to facilitate the check of electrical conductivity in this case, it is preferable to ground the respective shunt buses through an associated resistor having predetermined resistance values.

BRIEF DESCRIPTION OF THE DRAWINGS

The above and other objects, features and advantages of the present invention will be more apparent from the following description taken in conjunction with the accompanying drawings, in which.

DETAILED DESCRIPTION OF THE PREFERRED EMBODIMENTS

Figure 1A:
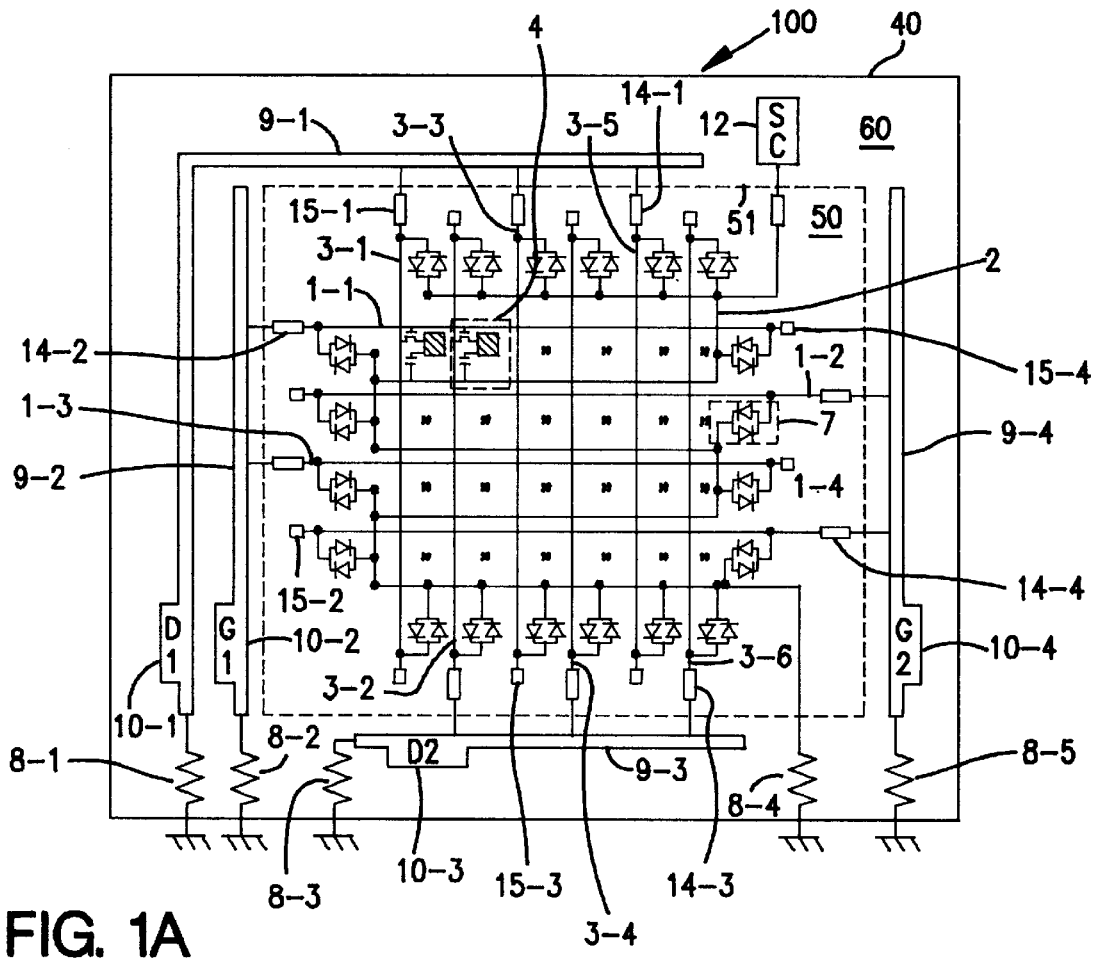
FIG. 1(a) is a plan view illustrative of an LCD panel according to a first embodiment of the present invention.
Figure 1B:
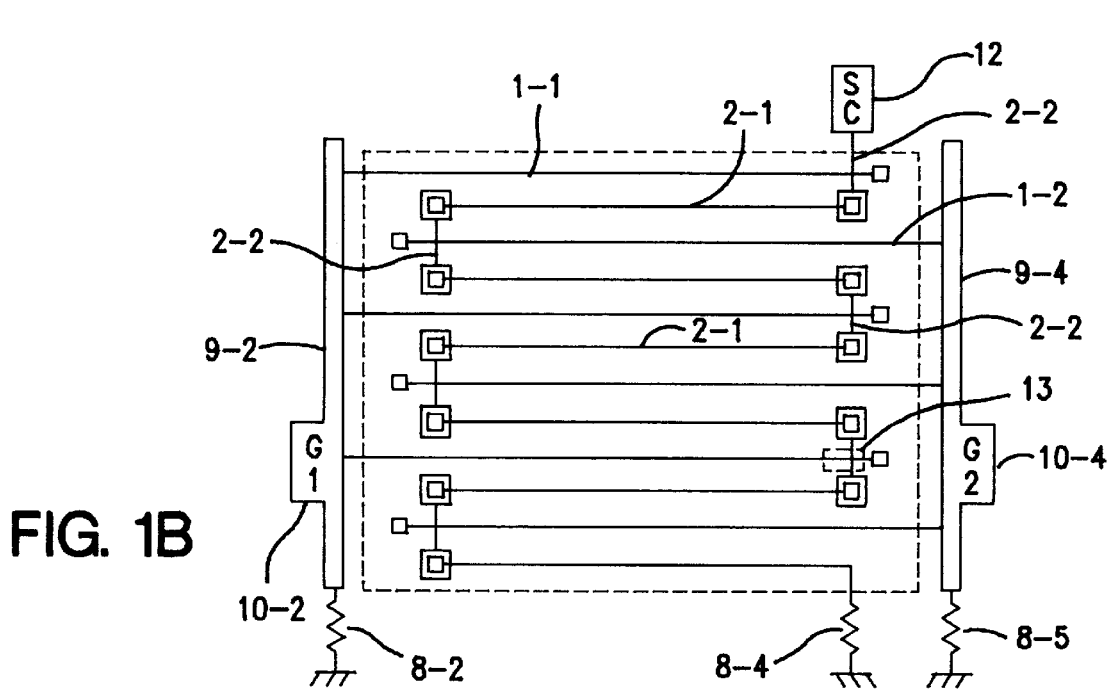
FIG. 1(b) is a plan view of the panel shown in FIG. 1(a) except for a part of wirings.

Referring now to FIG. 1, an LCD panel 100 according to the first embodiment of the present invention is formed on a transparent insulating substrate 40 such as a glass substrate. This substrate 40 has on a surface thereof an active matrix portion 50 surrounded by a broken line 51 and a shunt bus forming portion 60 around the matrix portion 50.

Figure 3:
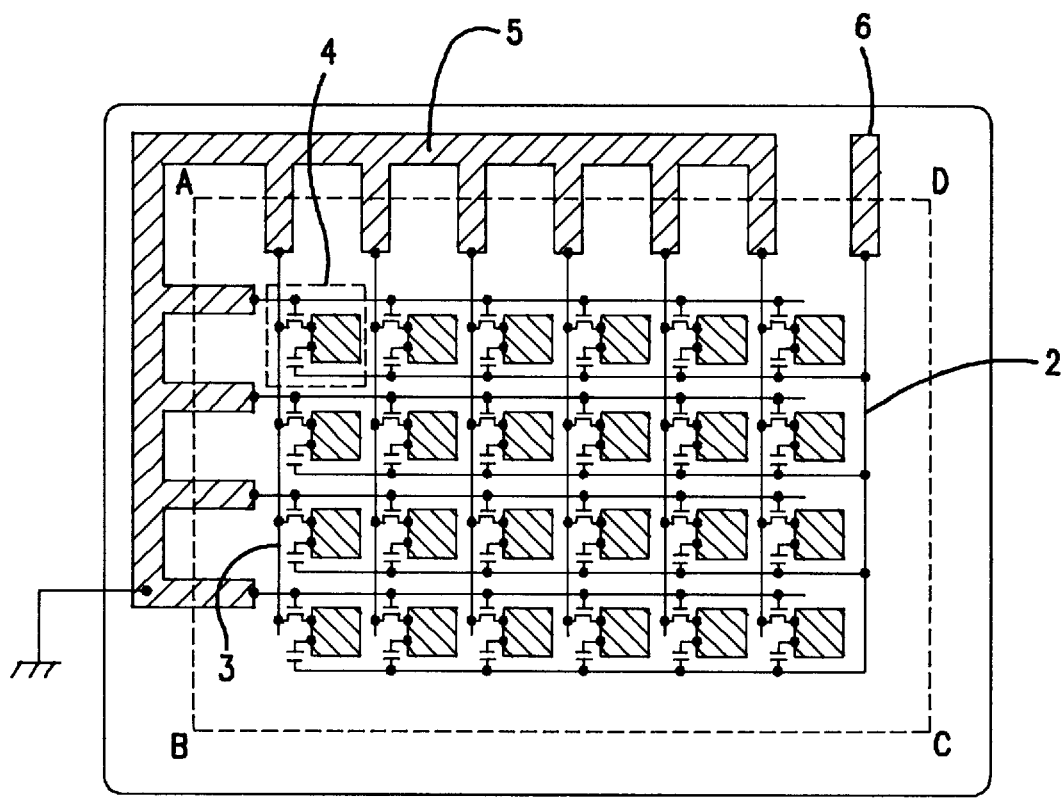
FIG. 3 is a plan view illustrative of an LCD panel according to the prior art, schematically.

The active matrix portion 50 including a plurality of scan signal lines 1 arranged in rows, a plurality of data lines 3 arranged in columns, and a plurality of pixels 4 each connected to one of the scan signal lines 1 and one of the data lines 3, each of the pixels 4 being composed of a TFT, a pixel electrode and a storage capacitor, similarly to that shown in FIG. 3. The respective one ends of the storage capacitors of the pixels 4 are connected in common to storage wiring 2.

The shunt bus forming region 60 includes four shunt buses 9-1 to 9-4 which are formed independently of one another in accordance with the present invention. Unlike the LCD panel shown in FIG. 3, the shunt buses 9-1 to 9-4 are grounded through respective resistors 8-1 to 8-3 and 8-5. The shunt bus 9-2 is further connected to the odd-numbered scan signal lines 1-1, 1-3, . . . , and the shunt bus line 9-4 are connected to the even-numbered scan signal lines 1-2, 1-4, . . . As shown, the buses 9-2 and 9-4 are provided respectively on the left and right sides of the active matrix portion 50. On the other hand, the shunt bus 9-1 are connected the odd-numbered data lines 3-1, 3-3, . . . , and the shunt bus line 9-3 are connected to the even-numbered data lines 3-2, 3-4, ... These buses 9-1 and 9-3 are provided respectively on the upper and lower sides of the active matrix portion 50. Pads 10-1 to 10-4 are provided for the respective shunt buses 9-1 to 9-4. Although, the resistors 8 exists, the shunt buses 9 are grounded, and, therefore, the electrostatic charge, which may be occur during its manufacturing process, is discharged there-through. The TFT's are thereby protected against the electrostatic charge.

Moreover, since the shunt buses 9-1 to 9-4 are independent of each other, the test of short-circuited conditions among scan signal lines 1, among the data lines 3 and/or between the scan signal line and the data line become possible. The test method will be described later in detail.

Further, in this embodiment, the storage wiring 2 connected to the storage capacitors of the respective pixels 4 is formed as a single wiring line in a meandering shape along the respective scan signal lines 1, as shown in FIG. 1(*a*). One end of the storage wiring 2 is connected to a testing/measuring pad 12 and the other end is grounded through a resistor 8-4. Further, in order to provide electrostatic-discharging paths between the respective scan signal lines 1 and the storage wiring 2 and between the respective data lines 3 and the storage wiring 2, discharge diodes 7 are provided, as also shown in FIG. 1.

Therefore, in this embodiment, not only the TFT's but also the storage wiring 2 itself are protected against the electrostatic charge. In addition, a short-circuit test between the storage wiring 2 and the respective wirings 1 adjacent thereto becomes possible.

The test or check for a short-circuit is carried out as follows:

That is, by checking electric conductivity between the pads 10-2 and 12 by putting probe needles of a tester thereon, a short-circuit between the odd-numbered scan signal lines 1 and the storage wiring 2 can be tested. In this case, when there is any short-circuit, the resistance value becomes substantially 0 and, when there is no short-circuit, a sum of the resistors 8-2 and 8-4 is detected. Similarly, by checking electric conductivity between the pads 10-4 and 12, a short-circuit between the even numbered scan signal lines 1 and the storage wiring 2 can be tested.

Further, by checking electric conductivity between the pads 10-1 and 12 by putting probe needles of a tester thereon, a short-circuit between the odd numbered data lines 3 and the storage wiring 2 can be tested. In this case, when there is any short-circuit, the resistance value becomes substantially 0 and, when there is no short-circuit, a sum of the resistors 8-1 and 8-4 is detected. Similarly, by checking electric conductivity between the pads 10-3 and 12, a short-circuit between the even numbered data lines 3 and the storage wiring 2 can be tested.

Further, by checking electric conductivity between the pads 10-1 and 10-2 by putting measuring needles of a tester thereon, a short-circuit between the odd numbered data lines 3 and the odd numbered scan signal lines 1 can be tested. In this case, when there is any short-circuit, the resistance value becomes substantially 0 and, when there is no short-circuit, a sum of the resistors 8-1 and 8-2 is detected. Similarly, by checking electric conductivity between the pads 10-2 and 10-3, between the pads 10-4 and 10-1 and between the pads 10-4 and 10-3, short-circuits between the corresponding lines can be tested.

By selecting two pads for test as mentioned above, the short-circuit test for various wirings becomes possible. Therefore, by inserting this test step into a series of manufacturing steps of the panel, undesirable short-circuit circuit can be found earlier, so that repair and/or reforming becomes easy.

Now, a method of fabricating the LCD panel of the first embodiment will be described together with the above-mentioned test.

First, a film of metal of such as Cr is formed on a whole surface of the transparent insulating substrate 40 by a sputtering method. The metal film thus formed is selectively etched to form the scan signal lines 1, a part of the storage wiring 2-1, the shunt bus lines 9-2 and 9-4 and the resistors 8-2, 8-4 and 8-5, as shown in FIG. 1(*b*). It is to be noted that in this embodiment, the storage line 2 consists of a plurality of horizontal segments 2-1 and a plurality of vertical segments 2-2. Each of the resistors 8-2, 8-4 and 8-5 is formed of the same metal material as that of the shunt bus lines 9-2 and 9-4, but its width and length are made small and large, respectively, to provide a required resistance value. If desired, the resistors 8-2, 8-4 and 8-5 can have different values from each other.

As stated above, only the horizontal segments 2-1 of the storage wiring 2 are formed. Therefore, the respective segments 2-1 of the storage wiring 2 are in floating condition. The short-circuit condition is tested in this stage by contacting the probes between the pads 10-2 and 10-4. If any short-circuit is detected, it is understood that there is at least one residual metal layer connecting the adjacent wirings 1. The residual metal layer is, therefore, searched and then cut by using, for example, a laser. Repairing is thus performed. Further, when the wirings are open electrically, it means that there is a portion of the wirings 1 or 2 in which it is physically cut. Therefore, it is also possible to repair it or reform.

Then, a gate insulating film such as silicon oxide or a silicon nitride film is formed on the whole surface of the substrate and then a semiconductor film of such as amorphous silicon is selectively formed as channel regions of the TFT's. Further, through-holes are selectively formed in the gate insulating film. Thereafter, a film of metal such as Cr is again formed on the whole surface of the substrate and the data lines 3, the shunt bus lines 9-1 and 9-3 and the resistors 8-1 and 8-3 are selectively formed by selectively etching the metal film. In this case, the remaining segments 2-2 of the storage wiring 2 are formed as shown in FIG. 1(*b*) and connected to the portions 2-2 through the through-holes of the gate insulating film. As a result, the single meandering storage wiring 2 is formed. Crossing portions 13 of the scan signal lines 1 and the storage wiring 2 and crossing points between the scan signal lines 1 and the data lines 3 shown in FIG. 1(*a*) are, of course, insulated by the insulating film. As well known, a portion of the scan signal line 1 becomes as a gate electrode of the TFT and a portion of the data line 3 becomes a drain (source) of the TFT. Further, the source (drain) electrodes of the TFT's are formed simultaneously with the formation of the data lines 3.

After the above-mentioned step, it is possible to detect any short-circuit which may occur in a crossing point between wirings to be insulated from each other, by measuring a potential between the desired pads. Further, by measuring a potential between the pads 10-1 and 10-3, any short-circuit between two adjacent data lines 3 can be checked. If there is a short-circuit, it may be repaired depending upon a location thereof.

Thereafter, pixel electrodes are formed by selectively providing transparent electrodes of material such as ITO, and, after covering the whole surface of the substrate by a protective insulating film, a panel assembling work is performed.

Thus, in this embodiment, it is possible to check undesired short-circuit between wirings due to dust, etc., during manufacturing while protecting the TFT's against electrostatic charge generated during the manufacturing, so that it is possible to suitably repair the short-circuit or to reflect the fact to management or correction of the respective manufacturing steps. Further, since it is possible to find an irreparable short-circuit earlier, it is possible to prevent any defective substrate from being transported to a subsequent step.

In the above embodiment, the segments 2-1 of the storage wiring 2 are in the floating state in the first step as mentioned previously. Therefore, the electro-static charge generated during the same step or during transportation of the substrate 40 to the subsequent step may destory the wiring segments 2-1.

Figure 2A:
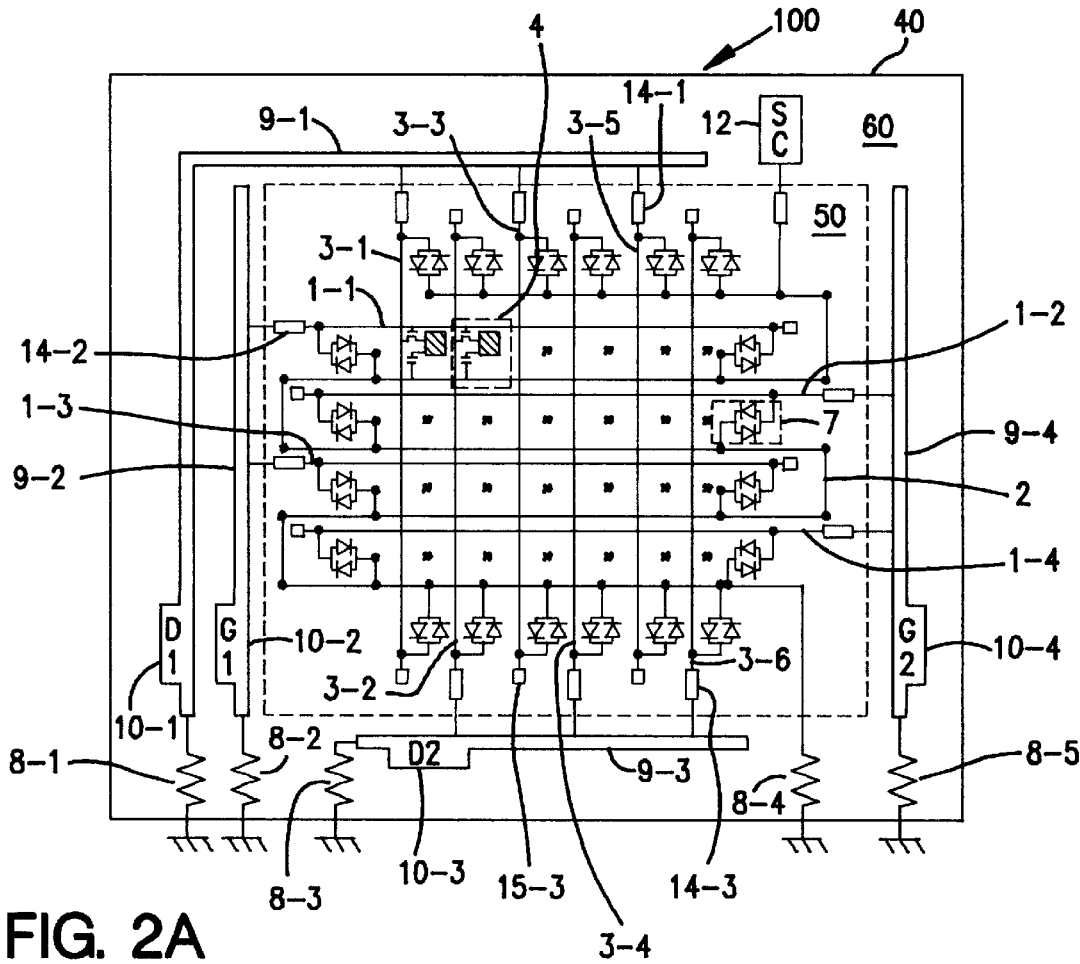
FIG. 2(a) is a plan view illustrative of an LCD panel according to a second embodiment of the present invention.

An LCD panel having a structure for further solving this problem is shown in FIG. 2 as a second embodiment of the present invention, in which the same constituents as those shown in FIG. 1 are depicted by the same reference numerals to omit further detailed description thereof.

Figure 2B:
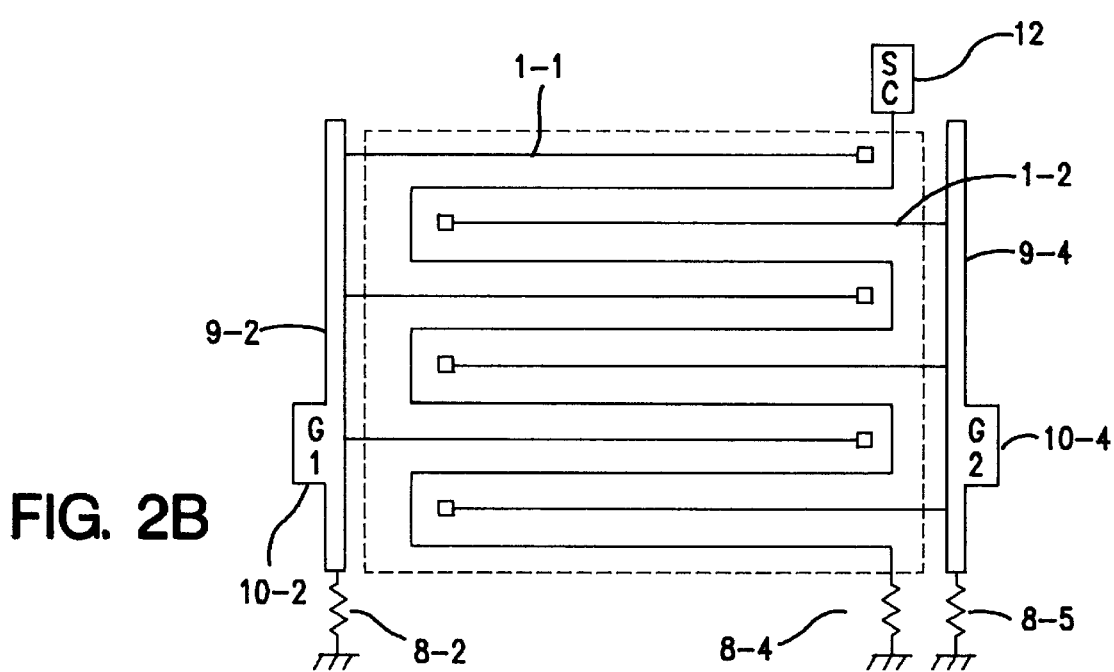
FIG. 2(b) is a plan view of the panel shown in FIG. 2(a) except for a part of wirings.

In the panel shown in FIG. 2, particularly, FIG. 2(b), the whole storage line 2 and the associated resistor 8-4 are formed simultaneously. Specifically, a film of metal such as Cr is formed on a whole surface of the transparent insulating substrate 40 and then selectively etched to form the scan signal lines 1, shunt buses 9-2 and 9-4 and resistors 8-2 and 8-5, etc. Simultaneously therewith, a meandering storage wiring 2, the grounding resistor 8-4 and the pad 12 are formed. With this construction, it is possible to prevent the storage wiring 2 from being damaged by the electrostatic charges. Further, since there is no crossing portion between the scan signal lines 1 and the storage wiring 2, there is no possibility of short-circuit between them. It is further possible to check undesired short-circuit between the adjacent wirings 1 and 2 by checking the short-circuit between the pads 10-2 and 12 and between the pads 10-4 and 12 and, if there is any short-circuit, it can be repaired. In repairing the short-circuit, it is preferable to find a location of the short-circuit by scanning the substrate by a laser beam and, when the location is found, to cut the portion by irradiating the latter with the laser beam while increasing the laser power.

As described, according to the present invention, a shunt bus structure is provided, for which a test for short-circuit between wirings can be performed easily while realizing a protection against damage due to electrostatic charge.

It is apparent that the present invention is not limited to the above embodiments but may be modified and changed without departing from the scope and spirit of the invention.

What is claimed is:

1. A liquid crystal display panel comprising:
    a plurality of scan signal lines;
    a plurality of data lines;
    a plurality of pixel electrodes arranged in a matrix;
    a plurality of transistors each connected to one of said scan signal lines and a respective one of said data lines;
    a plurality of storage capacitors each having a first node connected to a corresponding one of said pixel electrodes;
    a storage line connected to all second nodes of said storage capacitors;
    a plurality of discharge elements each connected between said storage line and a respective one of said scan or data lines;
    a first shunt bus line connected to a first group of said scan signal lines; and
    a second shunt bus line connected to a second group of said scan signal lines, and electrically separated from said first shunt bus line.

2. The liquid crystal display panel as recited in claim 1, wherein said scan signal lines, said storage line, said first shunt bus line and said second shunt bus line are comprised of a single metal film.

3. The liquid crystal display panel as recited in claim 2, further comprising:
    a third shunt bus line connected to a first group of said data lines, and electrically separated from said first and second shunt bus lines; and
    a fourth shunt bus line connected to a second group of said data lines, and electrically separated from said first, second and third shunt bus lines.

4. The liquid crystal display panel as recited in claim 1, wherein said panel defines a display plane, and wherein a spacing is continuously maintained between said storage line and said scan signal lines in said display plane.

5. The display panel of claim 1, wherein said storage line is grounded.

6. The display panel of claim 5, wherein said storage line comprises a plurality of first portions between adjacent ones of said scan lines, said first portions being connected in series with each other.

7. This display of claim 3, wherein said third and fourth shunt bus lines are grounded.

8. The display panel of claim 1, wherein said first and second shunt bus lines are grounded.

9. A liquid crystal display panel comprising an active matrix portion including a plurality of scan signal lines, a plurality of data lines and a plurality of transistors each connected to one of said scan signal lines and a respective one of said data lines, and a shunt bus forming portion provided around said display panel portion and including first, second, third and fourth shunt bus lines formed independently of one another, said first shunt bus line being connected to even-numbered ones of said scan signal lines, said second shunt bus line being connected to odd-numbered ones of said scan signal lines, said third shunt bus line being connected to even-numbered ones said data lines, and said fourth shunt bus line being connected to odd-numbered ones of said data lines, wherein said first shunt bus is grounded through a first resistor, said second shunt bus being grounded through a second resistor, said third shunt bus being grounded through a third resistor, and said fourth shunt bus is grounded through a fourth resistor, and wherein said active matrix portion further includes a storage line grounded through a fifth resistor.

10. The panel claimed in claim 9, wherein said storage line meanders along each of said scan signal lines.

11. The display panel of claim 9, further comprising a plurality of pixels each connected to a respective one of said transistors, a plurality of storage capacitors each connected to a respective one of said pixels, and storage wiring connected to said storage capacitor of each of said pixels, wherein said storage wiring is electrically grounded.

12. The display panel of claim 9, further comprising a plurality of discharge elements each connected between ground and a respective one of said scan or data lines.

* * * * *